C. H. BIDWELL & J. R. LINEN.
Scale-Beam.
No. 221,149. Patented Nov. 4, 1879.
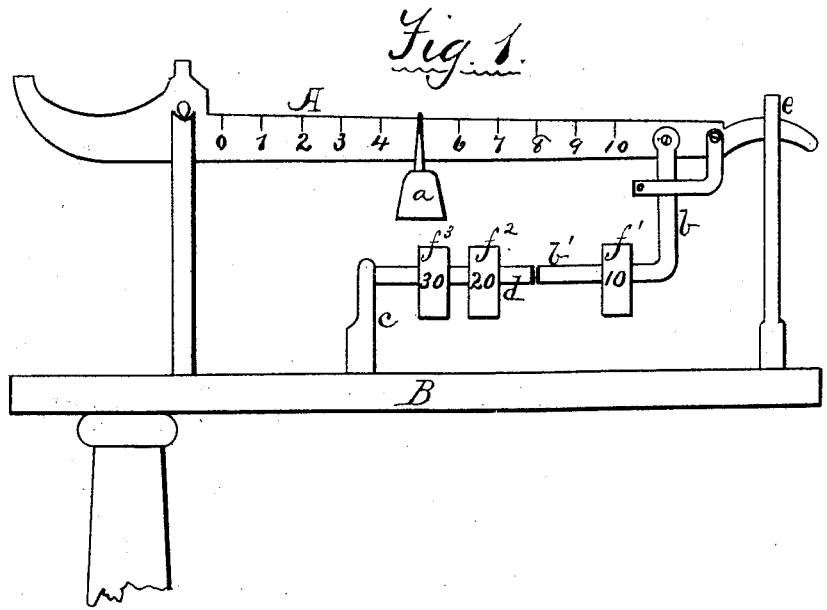
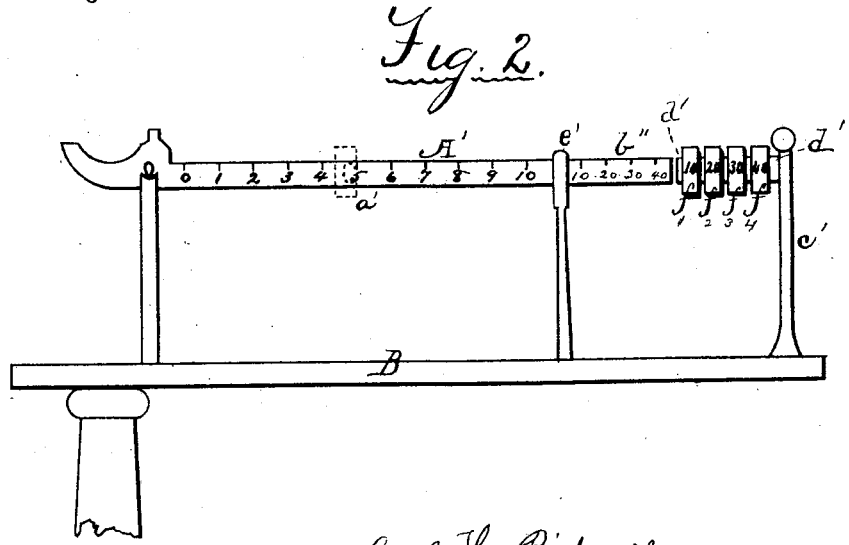

UNITED STATES PATENT OFFICE.

CARL H. BIDWELL AND JOHN R. LINEN, OF BUFFALO, NEW YORK.

IMPROVEMENT IN SCALE-BEAMS.

Specification forming part of Letters Patent No. 221,149, dated November 4, 1879; application filed May 26, 1879.

*To all whom it may concern:*

Be it known that we, CARL H. BIDWELL and JOHN R. LINEN, both of Buffalo, in the county of Erie and State of New York, have made certain Improvements in Platform - Scales, of which the following is a specification.

This invention relates more particularly to single-beam platform-scales, the object of the invention being to do away with the removable or loose poises or weights, which are liable to get lost, the right one not always being put on, and other disadvantages; and our invention consists in bending the counterpoise-rod inwardly at right angles, so as to make a horizontal arm, and opposite to this, the ends coming nearly in contact, is a second horizontal arm or poise-holder attached to a short standard fastened to the wooden cap or shelf of the scale. On this are set loosely the weighing-poises, which are weighted alike, and are stamped with figures progressively numbered in decimals, and each of which represents the weighing capacity of the single beam, so that when one poise is slid onto the counterpoise-arm it indicates that whatever is on the scale weighs at least the amount stamped on the poise, and, if more, then the single poise on the beam itself is moved forward from its left-hand or normal position to the figures at which the beam will balance, which, added to the amount on the poise, indicates the exact weight. If neither a single sliding poise nor the poise on the beam itself are sufficient, then the second sliding poise is moved onto the counterpoise-arm, and the beam-poise is moved to the balancing-figure. If two poises are not sufficient, then the third is slid on, and a fourth will be employed when necessary, all as fully hereinafter set forth.

In the drawings, Figure 1 is a side elevation; Fig. 2, also a side elevation, showing a variation in the manner of arranging the poises.

A represents the beam, with a single line of figures from 1 to 10 thereon, as shown in the drawings, though the beam may be numbered up to any amount desired. On the beam is a single poise, $a$, which may be a permanent sliding one, or an ordinary hanging or removable one, which will give the weighing capacity of the beam up to the numbers marked at the extreme end.

Instead of the usual counterpoise-rod and bottom piece hung on the end of the beam, we take off the bottom piece and bend the rod $b$ at right angles inwardly, making a horizontal poise-arm, $b'$. Opposite this is a poise-holder consisting of a standard, $c$, attached to the cap or shelf B, having an arm, $d$, set at right angles thereto, the extreme end almost touching the end of the counterpoise $b'$, only leaving just space enough to allow for the play up and down of the beam in the trig-loop $e$, and prevent the poises from sliding off. On this poise-arm $d$ are set two, three, or more permanently - sliding poises $f'$ $f^2$ $f^3$, &c., each stamped or marked with progressive decimal figures—as, for example, 10 20 30, as shown in the drawings.

As the beam is numbered to 10, and there are three poises, these would give a total weight of thirty pounds, and the poise $a$ on the beam will give, in addition, all the fractional weights up to forty pounds. If the beam should be marked to one hundred pounds, then the poises $f'$ $f^2$ $f^3$ would be marked 100, 200, and 300 pounds, and would give a total weight of three hundred pounds with the three poises, and the poise $a$ would give the additional weight to four hundred pounds, and so on.

The same effect can be got by putting the poise-holder $c'$ $d'$ at or near the end of the cap or shelf B of the scale, as shown in Fig. 2. In that case the weighing-beam A' will protrude beyond the trig-loop $e''$, acting as a counterpoise, $b'''$, and its extreme end will stand exactly opposite the extreme end of the poise-holder $c'$ $d'$, so that the poises $f'$ $f^2$ $f^3$, &c., can be slid therefrom onto the end of the weighing-beam A' or poise $b''$, each setting into a notch correspondingly marked to receive it thereon. These poises thus arranged will be differently numbered and decrease in size, beginning with the number at the end of the arm, and adding ten or more to each poise as it reaches the extreme end of the weighing beam or poise $b''$. These added to the highest numbers on the beam give just that added weighing capacity to the beam, the result and the object being the same as in Fig. 1, viz: permanent sliding poises to be used when wanted, in connection with the weighing-beam, either from a dependent counterpoise-arm like $b\ b'$, Fig. 1, or the end of the beam elongated into a counterpoise $b''$, to prevent the loss or misplacement of the poises, and do away with loose weights altogether, and also prevent using the wrong poises.

The weighing-beam A may be under the cap B, or over it, as shown; if under, then the poise-holder $c\ d$ would be arranged to hang under the cap instead of sitting on top, as shown.

We claim—

In a single-beam scale having a single line of figures on said beam, and in connection with a poise, $a$, the counterpoise-rod $b$, suitably attached to the beam, and bent at right angles into a horizontal counterpoise, $b''$, and the horizontal poise-holding rod $d$, attached by the standard $c$ to the cap B of the scale, the ends of the two rods $b$ and $d$ standing exactly opposite each other in close proximity, so that the counterpoises can be slid from one rod to the other, substantially as and for the purpose specified.

In witness whereof we have hereunto signed our names in the presence of two subscribing witnesses.

CARL H. BIDWELL.
JOHN R. LINEN.

Witnesses:
J. R. DRAKE,
T. H. PARSONS.